US008519362B2

(12) United States Patent
Labrot et al.

(10) Patent No.: US 8,519,362 B2
(45) Date of Patent: Aug. 27, 2013

(54) HEAD-UP DISPLAY DEVICE

(75) Inventors: Michael Labrot, Aachen (DE); Didier Jousse, Taverny (FR)

(73) Assignee: Saint-Gobain Glass France, Courbevoie (FR)

(*) Notice: Subject to any disclaimer, the term of this patent is extended or adjusted under 35 U.S.C. 154(b) by 341 days.

(21) Appl. No.: 12/933,609

(22) PCT Filed: Mar. 18, 2009

(86) PCT No.: PCT/FR2009/050449
§ 371 (c)(1),
(2), (4) Date: Dec. 8, 2010

(87) PCT Pub. No.: WO2009/122094
PCT Pub. Date: Oct. 8, 2009

(65) Prior Publication Data
US 2011/0073773 A1     Mar. 31, 2011

(30) Foreign Application Priority Data

Mar. 19, 2008  (FR) ...................................... 08 51772

(51) Int. Cl.
*G01N 21/64* (2006.01)
(52) U.S. Cl.
USPC ....................................................... 250/461.2
(58) Field of Classification Search
USPC ....................................................... 250/461.1
See application file for complete search history.

(56) References Cited

U.S. PATENT DOCUMENTS

| 6,979,499 B2 | 12/2005 | Walck et al. |
| 2002/0120916 A1 | 8/2002 | Snider, Jr. |
| 2006/0171007 A1 | 8/2006 | Chen et al. |

FOREIGN PATENT DOCUMENTS

| DE | 103 50 529 | 3/2005 |
| EP | 1 793 261 | 6/2007 |
| FR | 2 578 797 | 9/1986 |

OTHER PUBLICATIONS

U.S. Appl. No. 13/695,676, filed Oct. 1, 2012, Labrot, et al.

*Primary Examiner* — Casey Bryant
(74) *Attorney, Agent, or Firm* — Oblon, Spivak, McClelland, Maier & Neustadt, L.L.P.

(57) ABSTRACT

A laminated windshield incorporating a head up display device and a device displaying an image on such a laminated windshield. The windshield includes an assembly of two transparent sheets of inorganic glass or of an impact-resistant organic material of polycarbonate PC type, connected together by an insert of a thermoformable material or by a multilayer leaf incorporating such an insert, and at least one layer of at least one luminophore material chosen to respond to an exciting incident light wave in the ultraviolet or IR region by re-emitting light radiation in the visible region, the layer being positioned on the windshield, at an angle of vision of a driver, in a region of a layer of opaque material disposed on at least one of edges of the windshield.

15 Claims, 4 Drawing Sheets

HEAD-UP DISPLAY DEVICE

The present invention relates to the field of display systems projected onto at least partially transparent supports of the windshield type.

Quite particularly, the present invention relates to the field of systems called HUD or Head Up Display systems in the art. Such systems are used notably in aircraft cockpits, trains and more recently in automobile vehicles for private individuals (cars, trucks etc).

In such systems, glazing generally consists of a sandwich structure, comprising most simply two sheets of glass. The glass sheets are joined together by a thermoformable insert leaf more often containing or consisting of polyvinylbutyral (PVB).

Head up display systems displaying information projected onto glazing reflecting towards the driver or observer, are already known. These systems make it possible notably to provide the driver of the vehicle with relevant information, without having to look away from the forward field of vision of the vehicle. Such devices, apart from the amenity that they provide, thus confer additional safety. The driver then sees a virtual image that is situated at a certain distance behind the windshield.

In the most conventional way described to date, such a supplementary image is obtained on a windshield by projecting information onto a windshield having a laminated structure, namely formed of two glass sheets and an insert made of plastic. However, the driver then observes a double image: a first image reflected by the surface of the windshield directed towards the inside of the passenger compartment and a second image by reflection on the outer surface of the windshield, these two images being slightly offset relative to each other. This offset may make it difficult to see the information. In order to overcome this problem, mention may be made of a solution provided by U.S. Pat. No. 5,013,134 which describes a head up system using a laminated windshield formed of two glass sheets and a polyvinylbutyral (PVB) insert of which the two outer faces are not parallel but are in the form of a wedge, so that the image projected by a display source and reflected by the face of the windshield directed towards the passenger compartment is practically superimposed on the same image coming from the same source reflected by the face of the windshield directed outwards. In order to produce this wedge-shaped glazing, an insert leaf is used of which the thickness decreases from the upper edge of the glazing to the lower edge. However, although this solution is satisfactory in terms of the removal of a double image, it nevertheless has disadvantages. The angle of the wedge-shaped PVB must be perfectly adjusted to the specific configuration. It is also important for the profile of the PVB to be very regular and for it not to have thickness variations, since these are transmitted during assembly onto the windshield and lead to local angle variations. Thus, the slightest fault in the thickness of the PVB brings about an irreparable loss of optical quality of the image reconstructed on the windshield. Moreover, the image obtained by these HUD devices is a virtual image obtained by reflection of the incident beam on the windshield and, on account of this, can only be observed by the driver of the vehicle.

Another solution, already described in U.S. Pat. No. 6,979, 499 B2 by PPG Industries Ohio, consists of sending an incident beam, of a suitable wavelength, onto luminophores capable of responding to such an excitation by emitting light radiation in the visible light region. In this way, an image that is real and no longer virtual is formed directly on the windshield. This image is therefore visible by all the passengers of the vehicle. U.S. Pat. No. 6,979,499 B2 describes in particular laminated glazing with an insert of the polyvinylbutyral (PVB) type of which the two outer faces are parallel and in which an additional layer of luminophores is incorporated. These luminophores are chosen as a function of the wavelength of the incident exciting radiation. This wavelength may be in the ultraviolet region (down conversion) or in the IR (up conversion). Under this incident radiation, the luminophores re-emit radiation in the visible region. According to this document, such a construction makes it possible to reproduce any image whatsoever directly on the windshield or glazing. According to this disclosure, luminophore materials are deposited on all the main surface of one of the leaves making up the laminated glazing (PVB or glass) in the form of a continuous layer containing several types of luminophores. The desired image is obtained by selective excitation of a set area of the luminophore layer. Localization of the image and its form are obtained by means of an excitation source controlled and modulated by external means.

The practical difficulties of such a system are indeed measurable, which in order to function ideally requires costly and sophisticated means for implementing it:
- on the one hand for the creation and reproduction of the image on the glazing, making it necessary to obtain glazing incorporating, over a large part of its surface, a layer of luminophores of which the concentration and positioning must be judiciously chosen and carefully checked,
- on the other hand for the correct positioning and desired form of said image on the windshield, by employing a complex device making it possible, at the same time, to generate, modulate and direct the exciting radiation.

In addition, the system described in U.S. Pat. No. 6,979, 499 B2 presents problems of overall bulk and positioning in the dashboard of the vehicle.

Moreover, such HUD devices, incorporating luminophores on the windshield, are characterized, notably compared with conventional HUD systems using reflection, by low luminance, since the concentration of luminophores is limited by the maintenance, at the windshield, of sufficient light transmission and a sufficiently low fuzziness so as not to cause an unacceptable deterioration of the driver's view.

In particular, it appears that the luminous intensity of such devices still appears insufficient when the external luminosity is high, generally in daytime vision. In order to overcome this problem, it is of course possible to use excitation sources generating concentrated light, of the UV laser type, but such sources then present problems of danger and of confinement outside as well as inside the vehicle.

The present invention proposes the provision of a head up display HUD device, at least cost, to respond to all the previously mentioned problems.

More precisely, the present invention relates to a laminated windshield incorporating a head up display device, comprising an assembly of two transparent sheets of inorganic glass or of an impact-resistant organic material of the polycarbonate PC type, connected together by an insert of a thermoformable material or by a multilayer leaf incorporating such an insert, in the following order:
- a first outer sheet, of which one face is turned towards the outside of the vehicle and the other face is in contact with the insert or multilayer leaf, said other face being in addition coated on at least one of its edges with a layer of an opaque, non-transparent material, preferably black,
- a second inner sheet, of which one face is in contact with the insert or the multilayer leaf and the other face is turned towards the inside of the vehicle, said windshield being characterized in that:
it includes at least one layer of at least one luminophore chosen to respond to an exciting incident light wave in the ultraviolet or IR region by re-emitting light radiation in the visible region, and in that said layer is positioned on the windshield, at the angle of vision of the driver, in the region of the layer of opaque material.

Preferably, the windshield according to the invention is characterized in that:
it includes at least one layer, deposited in the form of a pictogram, of at least one luminophore material chosen to respond to an exciting incident light wave in the ultraviolet or IR region by re-emitting light radiation in the visible region,
said pictogram is positioned on the windshield at the angle of vision of the driver, in the region of the layer of opaque material.

Preferably, said luminophore layer is disposed on the face of the insert or of the thermoplastic leaf turned towards the passenger compartment of the vehicle, it being possible to choose the thermoformable material constituting said insert from the group of PVBs, plasticized PVCs, polyurethane PU, or ethylene vinyl acetates EVA.

For example, the transparent sheets are connected together by a multilayer leaf incorporating a PVB insert, for example a leaf comprising a succession of PVB/PET/PVB layers, in which PET is polyethylene terephthalate.

According to a possible embodiment, a layer of material may be used that does not reflect the exciting radiation, disposed in the assembly before the luminophore layer (10), for example on one of the faces of the inner glass sheet.

Alternatively or in a complementary manner, a layer of material reflecting visible light may be disposed in the assembly before the luminophore layer, for example on the inner face of the inner glass sheet.

The invention also relates to a device for displaying an image on a laminated windshield comprising a windshield as previously described and a source generating radiation in the UV or IR region, the beam of the radiation being directed towards the zone or zones of the glazing having the pictogram or pictograms.

In such a display device, the conventional source generating UV radiation may be chosen from sources of the electroluminescent diode type, LED, UV laser sources, for example of the solid laser type, a semiconductor diode laser, gas lasers, dye lasers, or an excimer laser.

For example, the source generating UV radiation consists of an LED grid.

The source may advantageously have a lens configured and disposed to concentrate the incident UV radiation on the luminophore layer or pictogram.

According to a possible embodiment, an electroluminescent diode is dedicated to displaying a pictogram on the windshield.

According to another embodiment, at least two electroluminescent diodes are dedicated to displaying a pictogram on the windshield.

According to an advantageous embodiment, the display device according to the invention may include means for modulating the power of the generating source according to at least two configurations: a configuration for night vision, in which the power of the source is adjusted so that the luminance of the pictogram lies typically between approximately 30 and approximately 100 $Cd/m^2$ and a configuration for daytime vision in which the power of the source is adjusted so that the luminance of the pictogram lies typically between approximately 200 and approximately 2000 $Cd/m^2$.

The invention and its advantages will be better understood on reading the following non-limiting embodiments, in relation to the appended figures.

FIG. 1 shows schematically a windshield and a device according to the invention.

Figure 1:
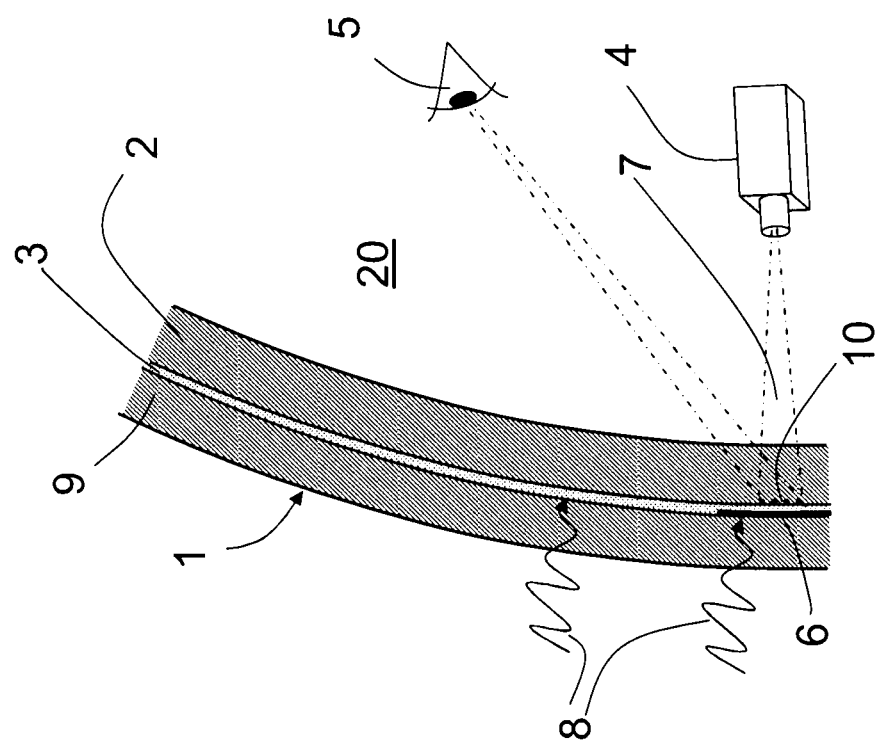
FIG. 1 shows a sectional view of a windshield equipped according to the invention for enabling pictograms to be displayed head up.

The windshield 1 is composed of two glass sheets 2 and 9. An insert leaf is present between the two sheets that is made of plastic such as PVB (polyvinylbutyral), plasticized PVC, PU or EVA or a multilayer thermoplastic leaf incorporating for example PET (polyethylene terephthalate), of which the succession of layers is for example PVB/PET/PVB.

A black coating 6 has been deposited on at least one edge of the inner face of the first glass sheet 9, before laminating, that is to say before the various leaves have been assembled.

The black coating is conventionally a coating already present on current glazing and having for example the function of decoration or of protecting, notably from the light, adhesive layers used for masking the collecting strips of the heating systems. Whatever the function, the black coating is generally apparent over all the peripheral part of the windshield. This black coating generally consists of an enamel of which the excellent thermal resistance and mechanical strength are known and which possesses a high adhesive strength to glass. Its composition typically contains glass frits capable of being vitrified at high temperatures, thus intimately bonding the enamel to the glass substrate.

A layer 10 is deposited in the region of the black enamel layer 6, containing at least one luminophore adapted to respond to an external excitation source 4. "In the region of the black enamel layer" is understood to mean, within the context of the present description, that the luminophore layer 10 is superimposed on the black enamel layer, if reference is made to the field of vision of the eye 5 of the driver of the vehicle. Moreover, the luminophore layer is deposited so that it draws a characteristic schematic sign marking for example instructions, information or imminent danger, of the pictogram type. Thus, contrary to the prior art, the signal that appears on the windshield is pre-printed on the windshield itself. Such a configuration has of course the advantage of being easily produced at least cost, only a tiny portion of the glazing having to be equipped with the luminophore layer, contrary to prior embodiments. The luminophore layer for the representation of a pictogram may be deposited according to the invention by any known deposition technique, for example, but in a non-limiting manner, by screen printing techniques, techniques of the ink jet type or techniques of the offset, flexographic or photo-engraving type.

Figure 2:
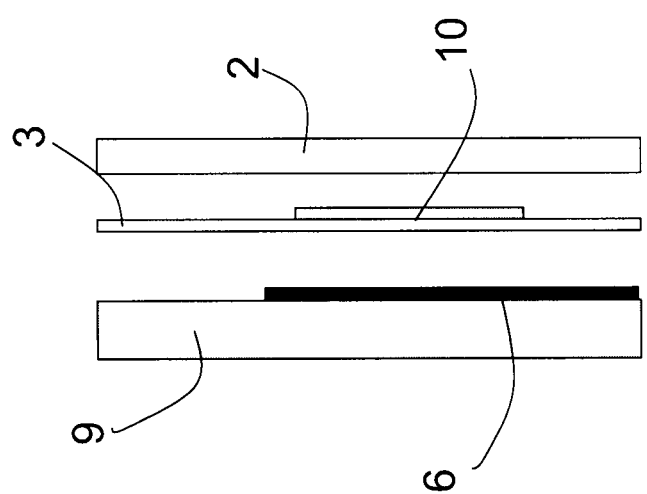
FIG. 2 shows in greater detail the succession of leaves of a windshield according to the invention.

FIG. 2 shows in greater detail the succession of leaves, in section, of a windshield according to the invention. Thus, the succession will be seen of layers: outer glass sheet 9/black enamel 6/plastic insert 3/luminophore layer (printed pictogram) 10/inner glass sheet 2. As shown in FIG. 2, the luminophore layer 10, in the form of a pictogram, is deposited on the innermost face of the plastic insert leaf. It will not however fall outside the scope of the invention if the deposit is produced on the inner face of the glass sheet 2 or preferably on the outer face of the glass sheet 2. The terms inner and outer used in the present description are employed with reference to the passenger compartment 20 of the vehicle (cf. FIG. 1). In general, the plastic insert leaves have the property of highly absorbing incident UV radiation. However, in the case of the use of a plastic insert sheet not absorbing UV or in the case of the use of an incident IR radiation (up conversion), it would not fall outside the scope of the invention if the luminophore layer was deposited on the outer face of the PVB or directly on the black background 6.

According to a possible embodiment, the luminophore layer 10 may for example be deposited within a transparent protective epoxy varnish, for example of the type of that marketed by the MARABU company under reference MARABU GL 914®, on one or other of the faces of the glass sheet 2. According to another embodiment, the luminophore layer may be added to the windshield after mounting the latter in the form of a transparent plastic leaf having said layer.

In the case where the luminophore layer is deposited on the PVB (or other) thermoplastic sheet, screen printing techniques, techniques of the inkjet type or techniques of the offset, flexographic or photo-engraving type may be employed, notably as a function of the thickness of the thermoformed leaf.

As shown in FIG. 1, a source of electromagnetic radiation 4 is used to convey an incident radiation 7 of suitable wavelengths, preferably but not exclusively in the ultraviolet region. The luminophores are chosen to exhibit a high absorption coefficient for the incident radiation. They are also chosen so as then to re-emit radiation in the visible region, that is to say radiation situated in the 400-800 m region, preferably with a high yield. Visible radiation coming from the luminophores is then directly observable by the eye 5 of the driver, who can in this way see the pre-printed pictogram on the windshield without having to take his eyes off the road. In this way, an image may be directly materialized on a laminated windshield without the necessity of adapting appreciably the structure thereof, which makes it possible to manufacture HUD systems according to the invention economically.

The luminophores used according to the invention are luminophores conventionally used in luminescence applications and are of course chosen according to the excitation source used. All existing luminophores may be used according to the invention. In practice, and in a more general manner, a luminophore will be chosen according to the invention that does not exhibit a tendency to diffuse into the insert material. This diffusion causes in time fogging of the printed image and a pictogram becomes blurred, notably at a higher temperature. For example, inorganic luminophores may be preferred more particularly if the layer 10 is deposited on the insert 3 made of thermoformable material (or on one face of one of the leaves, if the leaf 3 consists of several successive thermoformable layers), so as to prevent migration of the luminophore into the plastic material.

For example, the luminophores that may be used may be of any known type for responding to UV excitation (down conversion) or alternatively excitation in the IR region (up conversion). Such materials may for example be chosen from the field of inorganic luminophores, for example oxides, halides, chalcogenides, silicates, phosphates, borates and aluminates, that are more often metallic. More often, in order to obtain fluorescence, these materials constitute matrices doped with an element chosen from the group of the rare earths, for example from the group Eu, Ce, Er, Pr, Tb, Tm, Dy) or from the group of transition metals, for example from the group Mn, Cr, Ti, Ag, Cu, and Zn. Such products are for example already well known in the field of fluorescent lamps. These luminophores exhibit another advantage of being relatively cheap and present yields that may approach or even attain 100%.

Without departing from the scope of the invention, luminophores of the laser dye type may also be used according to the invention as well as organic polymers. According to the invention, it is also possible to select luminophores from the group of nanometric semi-conductors of the II-VI or III-V type, currently called quantum dots in the art.

Organometallic molecules may also be used as luminophores according to the invention. These molecules consist for example of a centre for the fluorescence consisting of at least one metal atom or a rare earth atom, surrounded by and bonded to organic groups.

The source used is for example a conventional UV source such as for example, but not in a limiting way, of the LED type. According to an alternative embodiment, a UV laser source may also be used, for example, but not in a limiting way, a solid laser, a semiconductor diode laser, gas lasers, dye lasers and an excimer laser. In a general manner, any known source of UV excitation may be used according to the invention.

Among all these sources, LEDs are however preferred by reason of their low cost, their low bulk and the ease with which they may be used and installed. Preferably, use will be made, according to the invention, of a lens for concentrating the incident radiation on the luminophore layer or pictogram. According to an advantageous embodiment of the invention and contrary to HUD vision devices of the prior art, the excitation source is preferably not subject to the employment of a complex device for modulating and directing the exciting radiation, such as a retro-projection system of the DLP (Digital Light Processing Projector) type. In particular, the excitation source is, according to the invention, preferably fixed and oriented directly towards the pictogram, without the need to modify its emission spectrum. In particular, the excitation source according to the invention may consist of a beam or of an LED grid positioned and hidden in the dashboard or in the roof of the vehicle. The LEDs are disposed according to techniques of the art facing the positions of the windshield incorporating the pictogram or pictograms to be displayed.

Moreover, positioning according to the invention of the luminophore layer in the region of the black enamel layer also has the advantage of substantially improving the intensity, contrast and clarity of the image. Notably in daytime vision, the intensity of the re-emitted visible radiation makes it possible, contrary to HUD devices of the prior art, for the driver to see the pictograms perfectly, even under conditions where the windshield 8 is strongly sunlit. According to another advantage of the present invention, the concentration of luminophores making up the pictogram may be strongly increased without fear of an increase in blurring or a reduction of light transmission at places where the luminophore is deposited.

It should also be noted that the present invention moreover makes it possible to solve, simply, directly and economically, the problem of the dangerousness of the sources used, notably when these deliver a concentrated beam of UV (or of IR). Thus, a black coating layer 6 is necessarily disposed according to the invention behind the layer of luminophore 10, in the direction of propagation of the incident radiation 7. In this way, it advantageously forms a layer absorbing UV and makes it possible to prevent, by virtue of its construction, any dangerous escape of incident radiation inside or outside the passenger compartment of the vehicle. Obviously, there would be no departure however from the scope of the invention if other supplementary layers that absorb the incident radiation were present in the luminophore layer 10, in the direction of propagation of the incident radiation 7. Finally, the black coating layer 6 makes it possible to prevent any degradation of the luminophores against external radiation 8 (UV, visible) and in this way ensures a life for the HUD system according to the invention matching that of the vehicle.

Moreover, by the presence of the black background 6 immediately behind the luminophore layer, the display is not visible from the outside.

According to another variant, it is also possible according to the invention to add, before the luminophore layer 10, for example on one of the faces of the glass sheet 2, a layer of a material known to be antireflecting for the excitant radiation used, notably with the aim of improving the contrast of the pre-printed pictogram. According to a variant that may be complementary to the preceding embodiment, the windshield may also be provided with a layer reflecting visible light, disposed in the laminated windshield between the luminophore layer and the black background, preferably directly behind the layer of luminophores, for example on the inner face of the sheet 2, in order to increase the luminescence or even the contrast.

Without departing from the scope of the invention, concentrated light sources of the laser type may be used when the excitation source emits radiation in the infrared region, that is to say in the up conversion region.

It is of course possible according to the invention to use a mixture of luminophores in the layer 10, for example a luminophore emitting in the red, a luminophore emitting in the blue and a luminophore emitting in the green, each of these luminophores having an absorption band that may be different and/or distinct, permitting excitation by the incident radiation or radiations. Within the layer 10, the various luminophores are for example deposited precisely on the insert 3 and the sheet 2 so as to form a multicolored preprinted pictogram.

According to a possible alternative, various types of luminophore are mixed within the layer of luminophores to obtain the desired color that may extend as far as white.

According to another embodiment, some LEDs may be selected, positioned and oriented so as to excite selectively one type of luminophore and others so as to excite selectively another type of luminophore on the same pictogram. Alternatively, a single type of LED may be used for exciting all the luminophores making up the pictogram.

Figure 3:
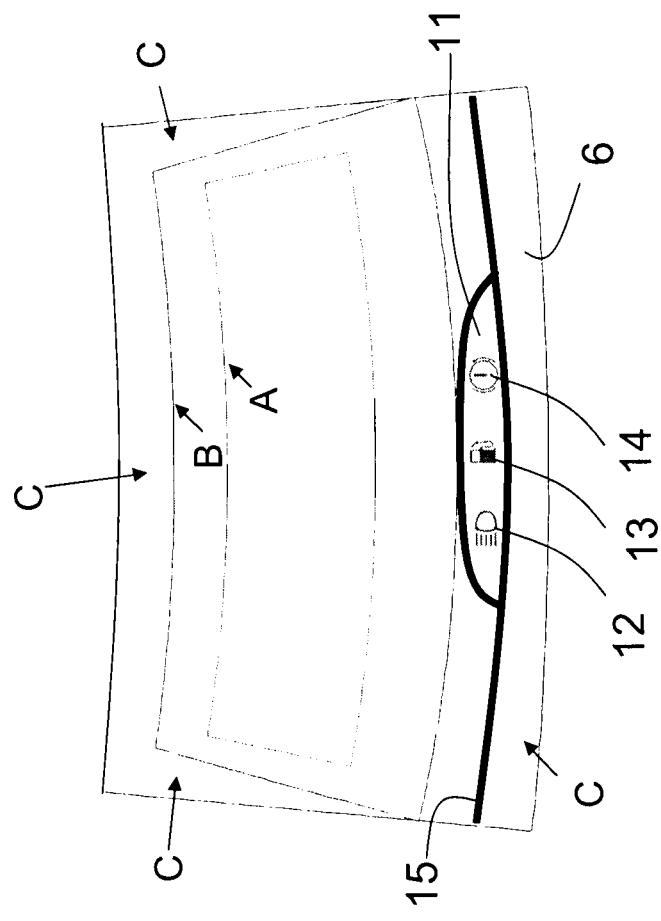
FIG. 3 shows a front view in elevation of the windshield according to the invention.

FIG. 3 shows a front elevation view of the windshield according to the invention. On the windshield 1, the various zones of vision for the driver according to European standard ECE 43, annex 18, have been shown schematically: the zone A that corresponds to the central zone of vision of the driver, the zone B that corresponds to an intermediate zone and a peripheral zone C that overlays, on currently marketed windshields, the black background 6 made of enamel, deposited typically by screen printing on all the periphery of the laminated windshield. For reasons of legibility in FIGS. 3 and 4, the upper limit of the screen-printed black layer 6 has been represented only by a black line 15. As shown in FIG. 3, black enamel is also deposited in a supplementary zone 11 in the region of the lower edge of the glazing and in a central position, for example as far as the limit of the zone B. The layers of luminophores 12, 13, 14 of the same nature or emitting visible light of various colors are also deposited by screen printing in the region of the supplementary zone 11 so as to form a collection of pictograms in the lower part of the windshield. Associated with these pictograms, electroluminescent diodes LED, hidden in the dashboard, make it possible to display selectively one or other of these pictograms according to the information available of requirements or of imminent danger for example.

Figure 4:
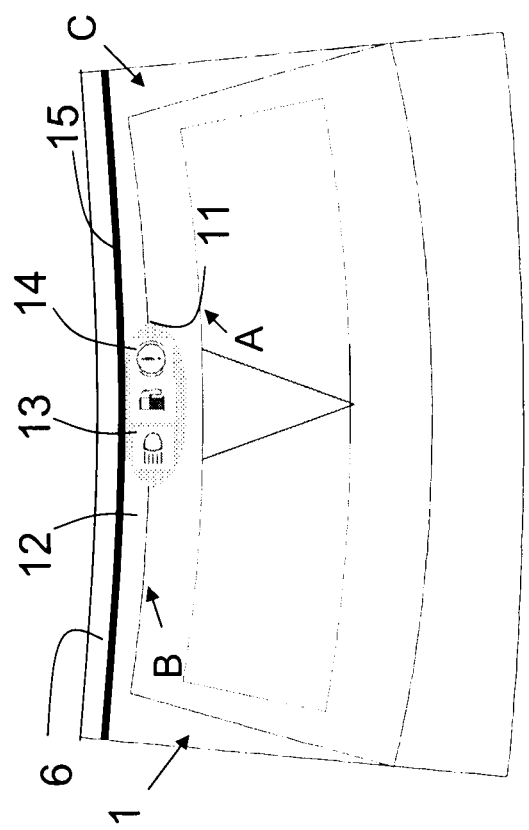
FIG. 4 shows a front view in elevation of another embodiment of the windshield according to the invention.

FIG. 4 illustrates another embodiment, in which the supplementary black background zone is disposed in the upper part of the glazing and is present in the form of a discontinuous layer, for example a black or broken screen-printed zone.

As an example and with reference to European regulations (ECE standard 43), it is possible to deposit a continuous or broken background in all zone C, and even at some places of zone B, notably the current location of the third sun blind, that is to say approximately and as shown in FIG. 4, between the central internal rear view mirror and the upper strip of the windshield. According to the ECE standard 43, such a zone is comprised overlying the central zone of the glazing in the form of a V, as shown in FIG. 4, it being understood that FIG. 4 is a simple representation that does not reflect the actual proportions of said zone.

In the same way as for the preceding embodiment, the layers of luminophores 12, 13, 14 of the same nature or emitting visible light of various colors are also deposited by screen printing in the region of the supplementary zone 11 so as to form a collection of pictograms in the upper part of the windshield. In this embodiment, the device for generating the exciting light, for example an LED grid, is very easily placed in the region of the roof of the vehicle, particularly behind the curved cover of the interior light of the vehicle.

The invention claimed is:

1. A laminated windshield incorporating a head up display device, comprising:
   an assembly of two transparent inorganic glass sheets connected together by an insert of a thermoformable material or by a multilayer leaf incorporating such an insert, in an order of:
      a first sheet, of which one face of the first sheet is turned towards the outside of the vehicle and the other face of the first sheet is in contact with the insert or multilayer leaf, the other face of the first sheet being in addition coated on at least one of its edges with a layer of an opaque, non-transparent material, or black material,
      a second sheet, of which one face of the second sheet is in contact with the insert or the multilayer leaf and the other face of the second sheet is turned towards the inside of the vehicle; and
   at least one layer of at least one luminophore material chosen to respond to an exciting incident light wave in the ultraviolet or IR region by re-emitting light radiation in the visible region, the layer being positioned on the windshield, at an angle of vision of a driver, in a region of the layer of the opaque, non-transparent, or black material, and the at least one layer is deposited in a form of a pictogram drawn in a characteristic sign marking vehicle instructions, information, or imminent danger, of the at least one luminophore material chosen to respond to the exciting incident light wave in the ultraviolet or IR region by re-emitting light radiation in the visible region.

2. The windshield as claimed in claim 1:
   wherein
   the pictogram is positioned on the windshield at the angle of vision of the driver, in the region of the layer of opaque, non-transparent, or black material.

3. A device for displaying an image on a laminated windshield comprising:
a windshield as claimed in claim 2 and a source generating radiation in the UV or IR region, a beam of the radiation being directed towards a zone or zones of the windshield having the pictogram.

4. The display device as claimed in claim 3, wherein the source generating UV radiation may be chosen from sources of electroluminescent diode type, LED, UV laser sources, of solid laser type, a semiconductor diode laser, gas lasers, dye lasers, or an excimer laser.

5. The display device as claimed in claim 4, wherein the source generating UV radiation includes an LED grid.

6. The display device as claimed in claim 5, further comprising a lens configured and disposed to concentrate incident UV radiation on the luminophore layer or pictogram.

7. The display device as claimed in claim 3, wherein an electroluminescent diode is dedicated to displaying the pictogram on the windshield.

8. The display device as claimed in claim 3, wherein at least two electroluminescent diodes are dedicated to displaying the pictogram on the windshield.

9. The display device as claimed in claim 3, further comprising
means for modulating power of the generating source according to at least two configurations:
a configuration for night vision, in which power of the source is adjusted so that luminance of the pictogram lies between approximately 30 and approximately 100 Cd/m$^2$, and
a configuration for daytime vision in which the power of the source is adjusted so that the luminance of the pictogram lies between approximately 200 and approximately 2000 Cd/m$^2$.

10. The display device as claimed in claim 3, wherein the source generating radiation does not comprise a device that modulates and directs the exciting incident light wave.

11. The laminated windshield as claimed in claim 1, wherein the luminophore layer is disposed on the face of the insert or of the thermoplastic leaf turned towards a passenger compartment of the vehicle.

12. The laminated windshield as claimed in claim 1, wherein the thermoformable material constituting the insert is chosen from the group of PVBs, plasticized PVCs, polyurethane PU, or ethylene vinyl acetates EVA.

13. The laminated windshield as claimed claim 1, wherein the transparent sheets are connected together by a multilayer leaf incorporating a PVB insert, or a leaf comprising a succession of PVB/PET/PVB layers, in which PET is polyethylene terephthalate.

14. The laminated windshield as claimed in claim 1, further comprising a layer of material that does not reflect the exciting radiation, disposed in the assembly before the luminophore layer, or disposed on one of the faces of the second glass sheet.

15. The laminated windshield as claimed in claim 1, further comprising a layer of material reflecting visible light disposed in the assembly before the luminophore layer, or disposed on the inner face of the second glass sheet.

* * * * *